United States Patent [19]

Grosfeld et al.

[11] Patent Number: 5,763,863
[45] Date of Patent: Jun. 9, 1998

[54] COMPACT BAR CODE SCANNING MODULE WITH FOLDED BEAM PATH AND REFLECTOR MOUNTED ON SPRING

[75] Inventors: Henry Grosfeld, Great Neck; Robert Doran, East Setauket; Paul Dvorkis, Stony Brook; Hal Charych, East Setauket, all of N.Y.

[73] Assignee: Symbol Technologies, Inc., Holtsville, N.Y.

[21] Appl. No.: 658,383

[22] Filed: Jun. 5, 1996

Related U.S. Application Data

[63] Continuation of Ser. No. 326,328, Oct. 20, 1994, Pat. No. 5,581,067, which is a continuation-in-part of Ser. No. 153,053, Nov. 17, 1993, Pat. No. 5,504,316, which is a continuation-in-part of Ser. No. 868,401, Apr. 14, 1992, Pat. No. 5,280,165, which is a division of Ser. No. 520,464, May 8, 1990, Pat. No. 5,168,149.

[51] Int. Cl.[6] ........................................... G06K 7/10
[52] U.S. Cl. ........................................ 235/462; 235/472
[58] Field of Search ............................ 235/462, 467, 235/472

[56] References Cited

U.S. PATENT DOCUMENTS

| | | |
|---|---|---|
| 4,962,980 | 10/1990 | Knowles ............................. 235/467 X |
| 4,971,410 | 11/1990 | Wike, Jr. et al. .................... 235/472 X |
| 5,115,120 | 5/1992 | Eastman ................................ 235/462 |
| 5,122,644 | 6/1992 | Hasegawa et al. ..................... 235/462 |
| 5,149,949 | 9/1992 | Wike, Jr. ............................... 235/467 |
| 5,179,271 | 1/1993 | Lindacher et al. ..................... 235/467 |
| 5,212,371 | 5/1993 | Boles et al. ........................... 235/472 |
| 5,410,139 | 4/1995 | Barkan ................................... 235/462 |
| 5,420,411 | 5/1995 | Salatto, Jr. et al. ................... 235/472 |
| 5,475,208 | 12/1995 | Marom ................................... 235/467 |
| 5,483,051 | 1/1996 | Marchi ................................... 235/462 |

*Primary Examiner*—Donald T. Hajec
*Assistant Examiner*—Karl Frech
*Attorney, Agent, or Firm*—Kirschstein et al.

[57] ABSTRACT

A light emitter emits light through an offset opening in a concave collector to a reflector that reflects the light along a first path to coded indicia to be read in an electro-optical reader. Light reflected from the indicia is reflected by the reflector to the collector which, in turn, directs the reflected light in a second path extending across the first path to a light detector. The reflector is mounted on a resilient spring for oscillating movement.

8 Claims, 3 Drawing Sheets

COMPACT BAR CODE SCANNING MODULE WITH FOLDED BEAM PATH AND REFLECTOR MOUNTED ON SPRING

REFERENCE TO RELATED APPLICATIONS

This application is a continuation of U.S. patent application Ser. No. 08/326,328, filed Oct. 20, 1994, now U.S. Pat. No. 5,581,067, which is a continuation-in-part of U.S. patent application Ser. No. 08/153,053, filed Nov. 17, 1993, now U.S. Pat. No. 5,504,316, which is a continuation-in-part of U.S. patent application Ser. No. 07/868,401, filed Apr. 14, 1992, now U.S. Pat. No. 5,280,165, which in turn is a division of application Ser. No. 07/520,464, filed May 8, 1990, now U.S. Pat. No. 5,168,149.

This application is also related to U.S. patent application Ser. No. 08/294,438, filed Aug. 23, 1994, now abandoned, which is a continuation of Ser. No. 08/037,143, filed Mar. 29, 1993 now abandoned, which is a division of Ser. No. 07/715,267, filed Jun. 14, 1991, now U.S. Pat. No. 5,235,167.

This application is also related to Ser. No. 08/271,729, filed Jul. 7, 1994, now abandoned, which is a continuation of Ser. No. 07/981,448, filed Nov. 25, 1992, now abandoned. This application is also related to Ser. No. 08/028,107, filed Mar. 8, 1993 now U.S. Pat. No. 5,408,081.

BACKGROUND OF THE INVENTION

1. Field of the Invention

The invention generally relates to a scanner module for use in an optical scanner, for example, a bar code scanner.

2. Description of the Related Art

A typical optical scanner (for example a bar code scanner) has a light source, preferably a laser light source, and means for directing the laser beam onto a symbol (for example a bar code) to be read. On route to the symbol, the laser beam is generally directed onto, and reflected off, a light reflecting mirror of a scanning component. The scanning component causes oscillation of the mirror, so causing the laser beam repetitively to scan the symbol. Light reflected from the symbol is collected by the scanner and detected by a detector such as a photodiode. Decode circuitry and/or a microprocessor algorithm is provided to enable the reflected light to be decoded, thereby recovering the data which is recorded by the bar code symbol.

Scanners of this general type have been disclosed, for example, in U.S. Pat. Nos. 4,251,798; 4,360,798; 4,369,361; 4,387,297; 4,593,186; 4,496,831; 4,409,470; 4,808,804; 4,816,661; 4,816,660; and 4,871,904, all of which patents have been assigned to the same assignee as the present invention, and all of which are hereby incorporated by reference.

In recent years, it has become more common for bar code scanners to have within them a distinct scanner module containing all the necessary mechanical and optical elements needed to create the scanning of the laser beam and to deal with the incoming reflected beam from the bar code that is being scanned. Using a separate scanner module, within the housing of the bar code scanner, facilitates a modular approach to design and manufacture, thereby keeping costs down, improving reliability, and facilitating the transfer of scanning technology to a variety of scanner housings. A typical prior art scanner module is disclosed in U.S. Pat. No. 4,930,848, to Knowles.

There are a large number of known ways of mounting a mirror within the scanning component to cause the necessary scanning motion of the laser beam. Some provide for oscillation in only a single direction, so that the scanning laser beam traces out a single path across the bar code being scanned. Others provide two dimensional scanning patterns, such as for example raster patterns or patterns of greater complexity. Examples of scanning components allowing two dimensional scanning are shown in U.S. Pat. No. 5,280,165, and in European Patent Application 540 781. Both of these are assigned to the same assignee as the present invention, and are hereby incorporated by reference.

As optical scanning systems have become more complex, and as the demand for smaller size and lower power consumption has increased, shock protection for the scanner modules has become more difficult. These highly efficient scan engines, with both resonant and non-resonant scanning elements are difficult to protect because the scanning element must be free to move for scanning but must be protected in the event of a shock (for example if the user drops the bar code scanner within which the scanner module is incorporated). Also, as sizes are reduced manufacturing tolerances begin to have more significant impacts on costs. Furthermore, it becomes more difficult to achieve accurate optical alignment during assembly, and to maintain that optical alignment during the life of the product.

SUMMARY OF THE INVENTION

Objects of the Invention

It is a general object of the invention at least to alleviate the problems of the prior art.

It is an additional object to provide a scanner module in which the scanning element is protected against shock.

It is a further object to provide a scanner module of increased compactness.

It is a further object to provide a robust, compact scanner module having reduced manufacturing/assembly costs.

Features of the Invention

According to the present invention there is provided a scan module for use in a system for electro-optically reading coded indicia, such as bar code symbols. The module includes a light emitter for emitting light; a light reflector mounted for oscillating movement on the module to reflect the emitted light from the light reflector along a first optical path toward the coded indicia during the oscillating movement; and a light collector adjacent the light emitter and having an opening through which the emitted light passes en route to the light reflector. The light collector has a generally concave reflecting surface with an axis of symmetry. The opening is offset from the axis. The light reflector faces the light collector to reflect light returning from the coded indicia to the generally concave reflecting surface of the light collector. A light detector senses light reflected by the generally concave reflecting surface of the light collector along a second optical path that extends across said first optical path, and generates an electrical signal corresponding to the coded indicia being read. This configuration makes for a compact scan module useful in many different systems.

Advantageously, the reflector is mounted on one end of a resilient spring whose other end is operatively connected to a permanent magnet. The permanent magnet is movable into and out of a passage extending through an electromagnetic coil. When energized, the coil attracts the magnet and imparts a force to the spring which, in turn, enables the reflector to oscillate.

DETAILED DESCRIPTION OF THE PREFERRED EMBODIMENT

Figure 4:
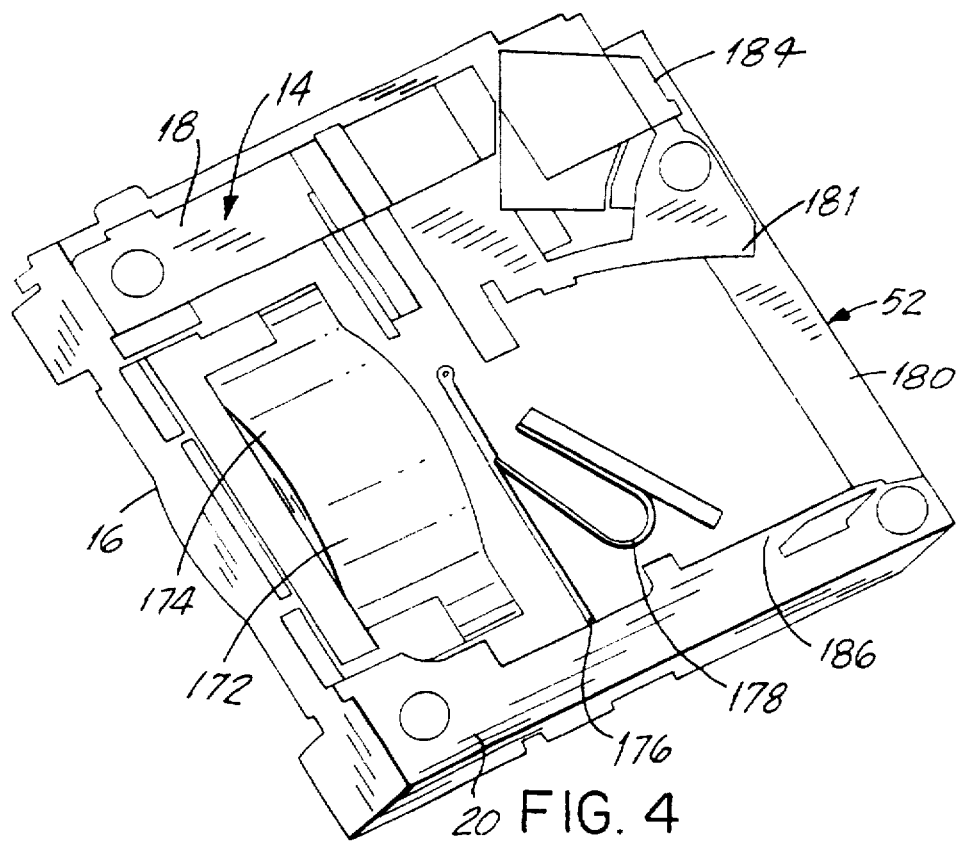
FIG. 4 is a view from below of the scanner module of FIG. 1.
Figure 5:
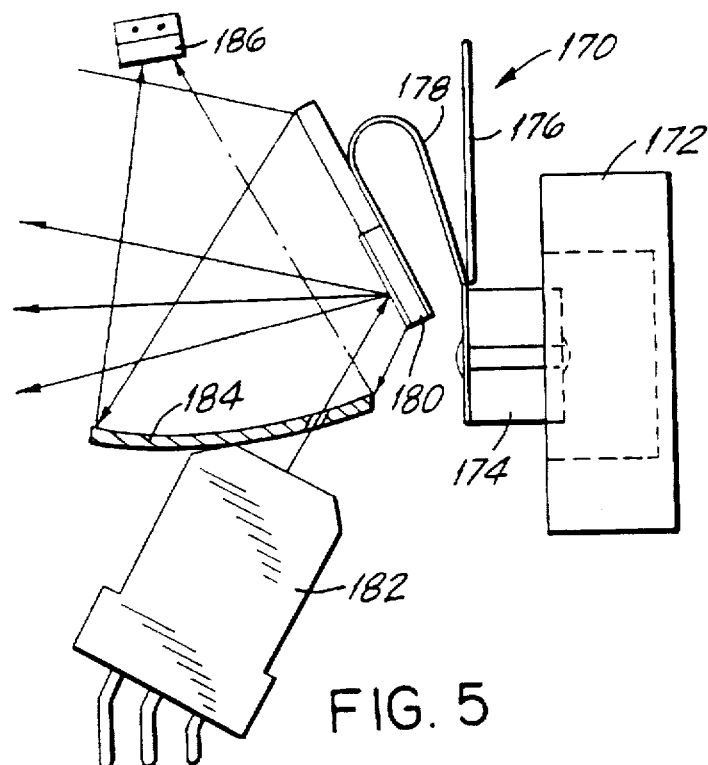
FIG. 5 shows, schematically, details of the scanning mechanism.
Figure 6:
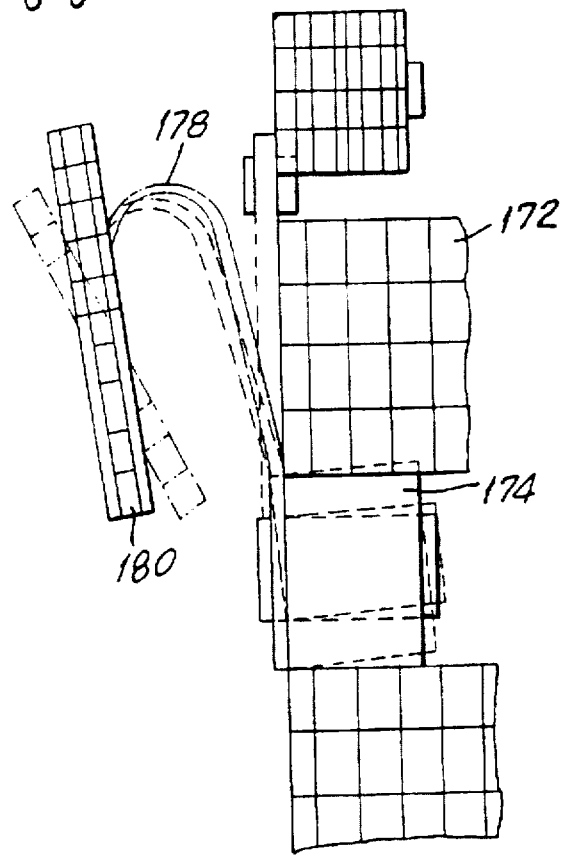
FIG. 6 shows the range of oscillation of the scanning element.

Reference will be made, first of all, to FIGS. 5 and 6 which show, schematically, details of the scanning arrangement. Following a description of these figures, reference will then be made to FIGS. 1 to 4 which show how the preferred scanning arrangement of FIGS. 5 and 6 may be incorporated into a scanning module.

The scanning arrangement 170 shown in FIG. 5 comprises an electromagnetic coil 172 having a central opening into which partially extends a permenent magnet 174. The coil 172 is rigidly secured to a support member (not shown), and the magnet 174 is resiliently coupled to the same support by means of an arm 176.

A U-shaped spring 178 is attached to the magnet 174 at one end, and the opposite end of the spring supports an optical element, preferably a reflector 180. Electrical leads (not shown) carry an energizing current or drive signal to the coil 172. The reflector 180 will oscillate in response to such electromagnet coil signal so as to scan in one or two dimensions, selectively. The spring 178 may be made of any suitable flexible materials, such as a leaf spring, a flexible metal coil or a flat bar having sufficient flexibility properties, and may be of a material such as a beryllium-copper alloy.

The reflector 180 is positioned between a laser beam source and lens assembly 182 and a target (not shown in FIG. 5). Between the reflector 180 and source 182 is a collector 184 having an opening 181 through which a light beam emitted by the laser source 182 may pass to the reflector 180. The collector is oriented so as to direct incoming light, reflected by reflector 180 and then collector 184, to a photodetector 186.

An important aspect of the embodiment of FIG. 5 is that the mass of reflector 180 is considerably less than the mass of permanent magnet 174. The mass of the mirror is selected to be less than about one-fifth the mass of the magnet, and the angle of vibration of the mirror as shown in FIG. 6, a diagram derived by computer simulation, is about seven times that of the permanent magnet.

The reflector 180 is capable of 2-D scanning. As described in copending application Ser. No. No. 07/943,232, filed on Sep. 10, 1992, the U-shaped spring 178, is formed of a plastic material, such as Mylar or Kapton. The arms of the U-shaped spring 178 and the planar spring 176 may be arranged to vibrate in planes which are orthogonal to each other. Mylar is a registered trademark of E I du Pont de Nemours and Co., Inc. for polyester material. Oscillatory forces applied to permanent magnet 174 by the electromagnetic coil 172 can initiate desired vibrations in both of the springs 178 and 176 by carefully selecting drive signals applied to various terminals of the coil, as discussed in the copending application. Because of the different frequency vibration characteristics of the two springs 178 and 176, each spring will oscillate only at its natural vibration frequency. Hence, when the electromagnetic coil 172 is driven by a signal having high and low frequency components, the U-shaped spring 178 will vibrate at a frequency in the high range of frequencies, and the planar spring 176 will vibrate at a frequency in the low range of frequencies.

A feature of the embodiment of FIG. 5 is that the laser beam emitted by source 182 impinges the reflector 180 at an angle that is orthogonal to the axis of rotation of the reflector. Hence, the system avoids droop in the 2-D scan pattern that tends to arise when the angle of incidence of the laser beam is non-orthogonal to the reflective surface.

Another feature of FIG. 5 is in the folded or "retro" configuration shown, with the laser beam source 182 off axis from that of the beam directed from the reflector 180 to the target. The detector field of view follows the laser path to the target by way of collector 184. The folded configuration shown is made possible by opening 181 in the collector. The retro configuration enables the scanning mechanism to be considerably more compact than heretofore possible.

Reference should now be made to FIGS. 1 to 4, which illustrate the preferred scanner module within which the scanning arrangement of FIGS. 5 and 6 may be incorporated. For ease of reference, parts of the module already described with reference to FIGS. 5 and 6 will be given the same reference numerals.

Figure 1:
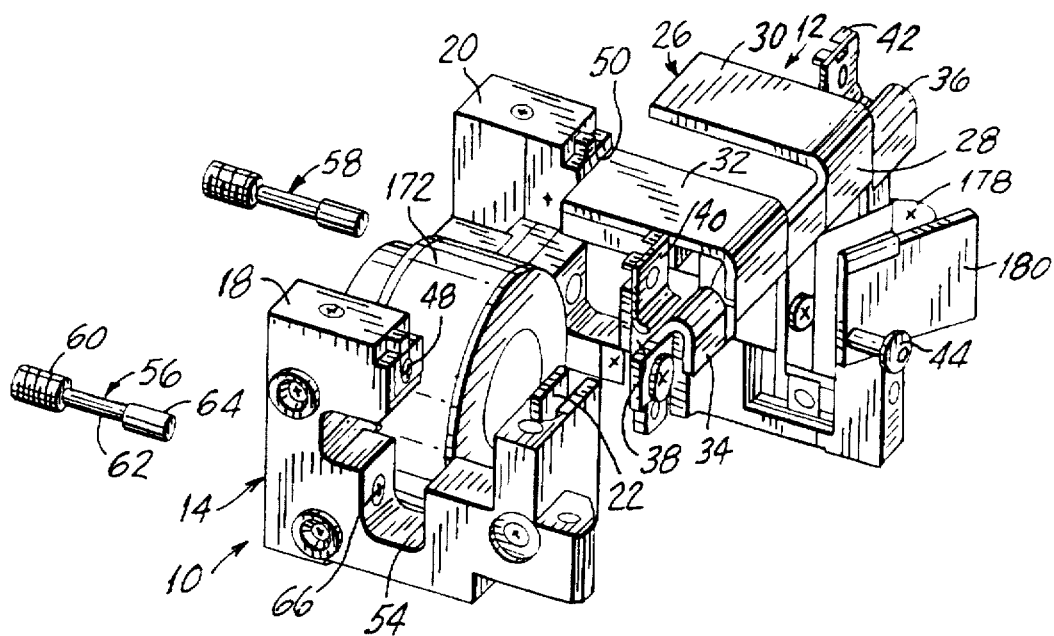
FIG. 1 is an exploded perspective view of a scanner module embodying the present invention.

As may best be seen in the exploded view of FIG. 1, the preferred scanner module consists of two separate sections: a chassis element 10 and a scan element 12. In FIG. 1, these two sections are shown in exploded form, prior to their securement together during the assembly process.

Figure 3:
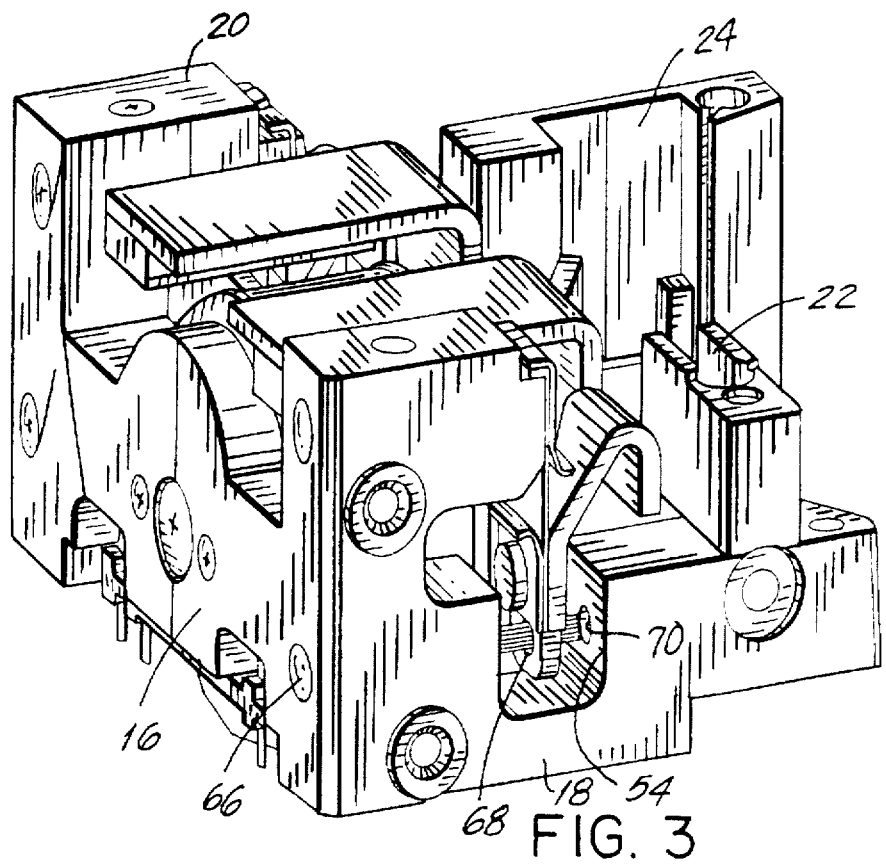
FIG. 3 is a fully assembled view of the scanner module of FIG. 1.

As is best seen in FIGS. 3 and 4, the chassis element 10 comprises a chassis 14 which carries the coil 172. The coil 172 is secured to a rear wall 16 of the chassis. At respective ends of the rear wall there are first and second forwardly-extending side supports 18, 20. The forward end of the side support 18 is provided with a vertical slot 22 (FIG. 3) into which is placed (FIG. 4) the collecting mirror 184 previously referred to. The forward part of the other side support 20 is provided with a larger vertical slot or cavity 24 (FIG. 3) into which the photodiode assembly 186 (FIG. 4) fits.

Figure 2:
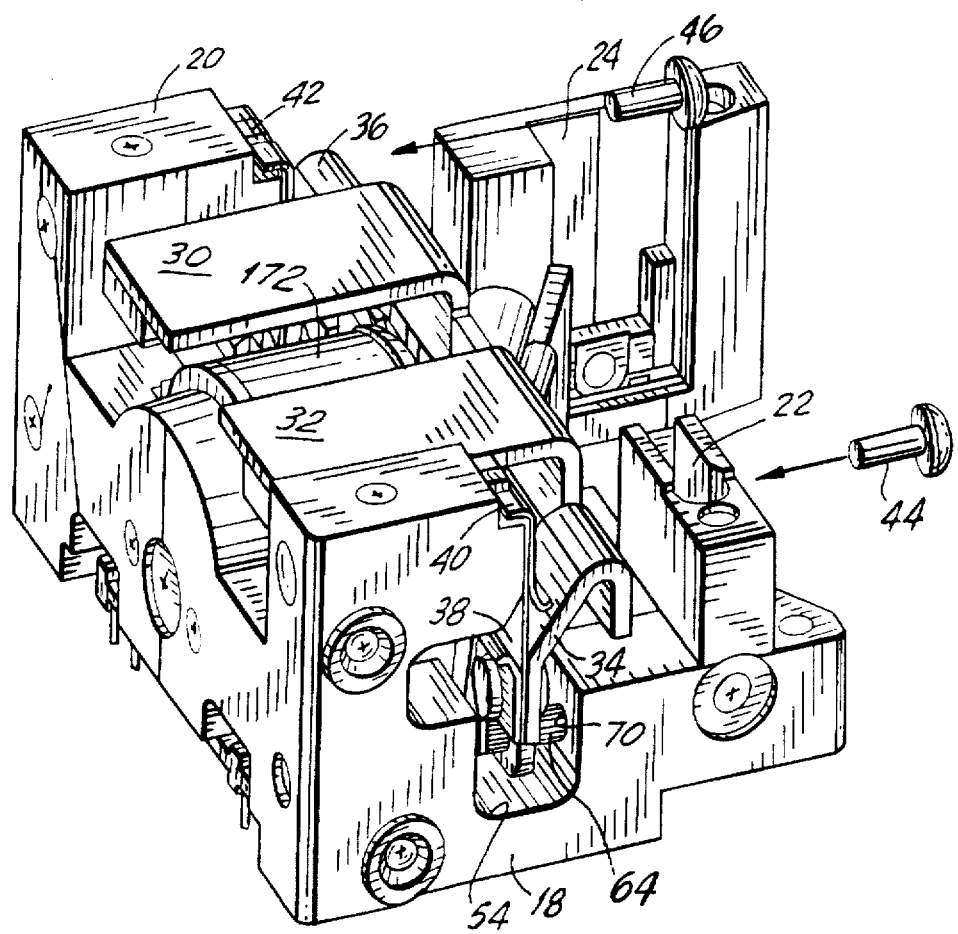
FIG. 2 is a partially assembled view of the scanner module of FIG. 1.

The features of the scan element 12 (which is during assembly secured to the chassis element 10) is best seen from a comparison of FIGS. 1, 2 and 4. The scan element comprises a beryllium-copper bracket generally shown at 26 having a vertical mounting portion 28 in a plane perpendicular to the axis of the coil 172. The upper part of the mounting portion is formed with two rearwardly-pointing prongs 30, 32 (not visible in FIG. 4). Secured to the mounting portion 28 is the spring 178, previously mentioned with reference to FIG. 5, which carries the mirror 180. On either side of the prongs 30, 32, the upper edge of the mounting portion 28 is bent backwardly to form first and second hanging brackets (34, 36, best seen in FIGS. 1 and 2). Screwed to these hanging brackets are respective first and second sheets of Mylar film 38, only one of which is visible in FIGS. 1 to 3. At the top of the Mylar sheets are secured respective hangers 40, 42.

The scanner module is assembled by bringing the scan element 12 up to the chassis element 10 and using screws 44, 46 to attach the hangers 40, 42 to respective bosses 48, 50 on the chassis side supports 18, 20. The relative positioning of the chassis element and the scan element, just prior to their securement together by the screws 44, 46 is shown most clearly in FIG. 2.

It will be appreciated that once the scanner module has been assembled, as described, the entire weight of the scan element, including the mirror 180, is supported by the hangers 40, 42 and the sheets of Mylar film 36, 38. The entire scan element is accordingly free to rock back and forth about a horizontal axis perpendicular to the axis of the coil 172 as the Mylar film flexes.

The operation of the device will now be described, with reference to FIG. 4. A laser beam, emanating from the laser beam source and lens assembly 182, passes through the hole 181 in the collector 184, and impinges upon the mirror 180 from which it is reflected via a window 52 to a bar code symbol to be read (not shown). Energization of the coil 172 causes oscillation of the mirror 180 in two directions: a first direction due to flexing of the spring 178 and a second direction due to flexing of the Mylar film 38. By appropriate control of the coil, a variety of scanning patterns can be produced, for example a raster pattern or other types of two-dimensional pattern.

Light reflected back from the bar code symbol passes back through the window 52, impinges on the mirror 180, and is reflected to the collector 184. The collector concentrates the light and reflects it back to the photo detector 186. Decoding circuitry and/or a microprocessor (not shown) then decode the signals received by the photo detector 186, to determine the data represented by the bar code.

It might be thought that because the entire weight of the scan element 12 is taken by the Mylar film 38, the system is likely to be very vulnerable to shocks, for example if the user accidentally knocks or even drops the bar code scanner within which the module is contained. However, provision has been made for that contingency by way of an anti-shock feature which will now be described.

First, as may be seen in FIGS. 2 and 3, the lower end of the hanging bracket 34 is located within a channel 54 formed in the side support 18 of the chassis. As the Mylar film 38 flexes, the hanging bracket 34 moves back and forth within the channel 54. The Mylar film 38 is prevented from over-flexing by the walls of the channel 54 which act as stops. A similar arrangement (not visible in the drawings) is provided on the other side.

A second level of protection is provided by alignment pins 56, 58, best seen in FIG. 1. Each pin comprises a threaded rear head portion 50, a reduced diameter smooth waist portion 62, and a smooth forward head portion 64.

In its operational position, shown in FIG. 3, the waist portion 62 of the pin passes through a hole 68 in the hanging bracket 34, with the forward head portion 64 being received within a correspondingly-sized blind bore 70 within one side of the channel 54. The rear head portion 60 of the pin is screwed into and held in place by a threaded bore 66 which opens at its forward end into the channel 54 and at its rearward end into the rear surface of the rear wall 16. There is a similar arrangement on the other side (not shown) for the second alignment pin 58.

The diameter of the waist portion 62 of the pin is some 0.02 inches smaller than the diameter of the hole 68 in the hanging bracket. This provides sufficient tolerance for the Mylar to flex slightly during normal operation of the device. However, if the module is dropped the presence of the pin prevents over-stressing and perhaps breaking of the Mylar.

The alignment pins have a further function of assisting accurate positioning of the scan element 12 with respect to the chassis during assembly. During assembly, the scan element is brought up into approximately the correct position, and the alignment pins are then inserted as shown in FIG. 2. At this point, the forward head portion 64 is a tight tolerance sliding fit both within the hole 68 in the hanging bracket and in the blind bore 70. This aligns the scan element to the pins and hence to the chassis. The scan element is then secured to the chassis, as previously described, using the screws 44, 46. The hangers 40, 42 provide a certain amount of adjustability or tolerance in positioning, thereby ensuring that the scan element can be attached to the chassis at the position defined by the alignment pins. The pins are then fully screwed into the threaded bores 66 until the end of the pin is flush with the rear face 16 of the chassis. At this point, as is shown in FIG. 3, the forward head portion of the pin has been received within the bore 70, and the waist portion has moved up to its final position within the hole 68 of the hanging bracket.

It will be understood that each of the elements described above, or any two or more together, may also find a useful application in other types of constructions differing from those described.

While the invention has been illustrated and described as embodied in a particular scanner module arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand point of prior art, fairly constitute essential characteristics of the generic or specific aspects of this invention and, therefore, such adaptations should and are intended to be comprehended within the meaning and range of equivalence of the following claims.

What is claimed as new and desired to be protected by letters patent is set forth in the appended claims.

We claim:

1. A scan module for use in a system for electro-optically reading coded indicia, comprising:

a) a light emitter for emitting light;

b) an elongated resilient spring having opposite end regions;

c) a generally planar mirror mounted on one of the end regions of the spring for oscillating movement on the module to reflect the emitted light from the mirror along a first optical path toward the coded indicia during said oscillating movement;

d) a permanent magnet operatively connected to the other of the end regions of the spring;

e) a light collector adjacent the light emitter and having an opening through which the emitted light passes en route to the mirror, said light collector having a generally concave reflecting surface with an axis of symmetry, said opening being offset from said axis;

f) said mirror facing the light collector to reflect light returning from the coded indicia to the generally concave reflecting surface of the light collector; and g) a light detector for sensing light reflected by the generally concave reflecting surface of the light collector along a second optical path that extends across said first optical path, and for generating an electrical signal corresponding to the coded indicia being read.

2. The scan module as claimed in claim 1, wherein the light emitted by the light emitter impinges the mirror at an angle of incidence that is orthogonal to the axis of oscillation of the mirror.

3. The scan module as claimed in claim 1, wherein the permanent magnet is movable into and out of a passage extending through an electromagnetic coil.

4. The scan module as claimed in claim 1, wherein the light emitter is a laser diode.

5. The scan module as claimed in claim 1, wherein the light detector is a photodiode.

6. A method of electro-optically reading coded indicia, comprising the steps of:

a) emitting light from a light emitter;

b) mounting a generally planar mirror on one end region of an elongated resilient spring for oscillating movement to reflect the emitted light from the mirror along a first optical path toward the coded indicia during said oscillating movement;

c) operatively connecting a permanent magnet to an opposite end region of the spring;

d) positioning a light collector adjacent the light emitter, and passing the emitted light through an opening in the collector en route to the mirror, said light collector having a generally concave reflecting surface with an axis of symmetry, said opening being offset from said axis;

e) facing the mirror toward the light collector to reflect light returning from the coded indicia to the generally concave reflecting surface of the light collector; and f) sensing light reflected by the generally concave reflecting surface of the light collector along a second optical path that extends across said first optical path, and generating an electrical signal corresponding to the coded indicia being read.

7. The method as claimed in claim 6, wherein the emitting step is performed by impinging the emitted light on the mirror at an angle of incidence that is orthogonal to the axis of oscillation of the mirror.

8. The method as claimed in claim 6; and further comprising the step of moving the permanent magnet into and out of a passage extending through an electromagnetic coil.

* * * * *